(12) United States Patent
Sei (10) Patent No.: US 7,889,371 B2
(45) Date of Patent: *Feb. 15, 2011

(54) IMAGE FORMING DEVICE HAVING DIVISION MANAGEMENT FUNCTION

(75) Inventor: Masaaki Sei, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 997 days.

This patent is subject to a terminal disclaimer.

(21) Appl. No.: 11/427,232

(22) Filed: Jun. 28, 2006

(65) Prior Publication Data

US 2008/0007615 A1    Jan. 10, 2008

(30) Foreign Application Priority Data

Jun. 30, 2005    (JP) ............................. 2005-191964

(51) Int. Cl.
  *G06F 3/12* (2006.01)
  *G03G 21/02* (2006.01)
(52) U.S. Cl. ...................................... 358/1.15; 399/79
(58) Field of Classification Search ................ 358/1.15; 399/79
  See application file for complete search history.

(56) References Cited

U.S. PATENT DOCUMENTS

| 5,300,761 | A * | 4/1994 | Kasahara et al. ............ 235/375 |
| 6,597,469 | B1 * | 7/2003 | Kuroyanagi ............... 358/1.15 |
| 7,558,500 | B2 * | 7/2009 | Shibata ......................... 399/79 |
| 2003/0202199 | A1 * | 10/2003 | Carter et al. ................ 358/1.13 |
| 2007/0002353 | A1 * | 1/2007 | Chen .......................... 358/1.13 |

FOREIGN PATENT DOCUMENTS

| JP | 2003-67832 | 3/2003 |
| JP | 2003-280879 | 10/2003 |
| JP | 2004-112084 | 4/2004 |
| JP | 2004-252709 | 9/2004 |
| JP | 2004-318225 | 11/2004 |
| JP | 2005-100111 | 4/2005 |
| JP | 2005-122211 | 5/2005 |

OTHER PUBLICATIONS

Japanese Office Action dated Feb. 23, 2010, Japanese Patent Application No. 2005-191964 (with English translation).

* cited by examiner

*Primary Examiner*—Twyler L Haskins
*Assistant Examiner*—Fred Guillermety
(74) *Attorney, Agent, or Firm*—Patterson & Sheridan, LLP (57) ABSTRACT

In a case where both a division management function which counts the number of pages printed for each division and a color management function which counts the only number of chromatically printed pages for each division are valid, an image forming device executes monochromatic printing even if a division to which a user belongs who has requested the printing is not determined, and executes color printing after the division to which the user belongs who has requested the printing is determined. Furthermore, the image forming device counts the number of monochromatically printed pages by a division undefined counter which is not associated with a specific division, and counts the number of chromatically printed pages by a division counter corresponding to the division to which the user belongs who has requested the printing.

12 Claims, 8 Drawing Sheets

IMAGE FORMING DEVICE HAVING DIVISION MANAGEMENT FUNCTION

CROSS-REFERENCE TO RELATED APPLICATIONS

This application is based upon and claims the benefit of priority from prior Japanese Patent Application No. 2005-191964, filed Jun. 30, 2005, the entire contents of which are incorporated herein by reference.

BACKGROUND OF THE INVENTION

1. Field of the Invention

The present invention relates to an image forming device such as a digital multifunction machine having a division management function which manages use results such as the number of pages printed for each division, and a method of managing the image forming device.

2. Description of the Related Art

Heretofore, among image forming devices such as a digital multifunction machine, there is a device having a function which manages the number of printed pages. In an image forming device such as the digital multifunction machine or a printer having a network communication function, there is assumed an operation mode in which the device is utilized by a large number of users. Among such image forming devices, there is a device having a function referred to as a division management function which manages the number of pages printed by each management unit referred to as a division. In this division management function, a division counter set in each division counts the number of the pages printed by each division.

BRIEF SUMMARY OF THE INVENTION

In one aspect of this invention, an object is to provide an image forming device capable of appropriately managing use results in accordance with a user's request, and a method of managing the image forming device.

An image forming device as one aspect of this invention has: an image forming unit having a first operation mode to form an image on an image forming medium and a second operation mode to form an image on the image forming medium, the second operation mode being different from the first operation mode; an identification unit to identify a division to which a user belongs who has requested image forming; a division management unit which manages the number of pages having the image formed thereon for each division identified by the identification unit; a limiting management unit to manage the only number of pages having the image formed thereon in the first operation mode for each division, in a state in which the division management unit is valid; and a control unit to execute the image forming in the second operation mode in the image forming unit, even when the division to which the user belongs is not identified by the identification unit, in a case where the management to be performed by the division management unit and the limiting management unit is valid.

A method of managing an image forming device as another aspect of this invention accepts a request for image forming in a first operation mode or a request for image forming in a second operation mode which is different from the first operation mode, identifies a division to which a user belongs who has requested the accepted image forming, and executes the image forming in the second operation mode, even when the division to which the user belongs who has requested the image forming is not identified, in a case where management is valid, the management being performed by a division management function which manages the number of pages having an image formed thereon for each division to which the user belongs and a limiting management function which manages only the number of pages having the image formed thereon in the first operation mode.

An image forming device as still another aspect of this invention has: image forming means having a first operation mode to form an image on an image forming medium and a second operation mode to form an image on the image forming medium, the second operation mode being different from the first operation mode; identification means for identifying a division to which a user belongs who has requested image forming; division management means for managing the number of pages having the image formed thereon for each division identified by the identification means; limiting management means for managing only the number of pages having the image formed thereon in the first operation mode for each division, in a state in which the division management means is valid; and control means for executing the image forming in the second operation mode in the image forming means, even when the division to which the user belongs is not identified by the identification means, in a case where the management to be performed by the division management means and the limiting management means is valid.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment for carrying out this invention will be described hereinafter with reference to the drawing.

Figure 1:
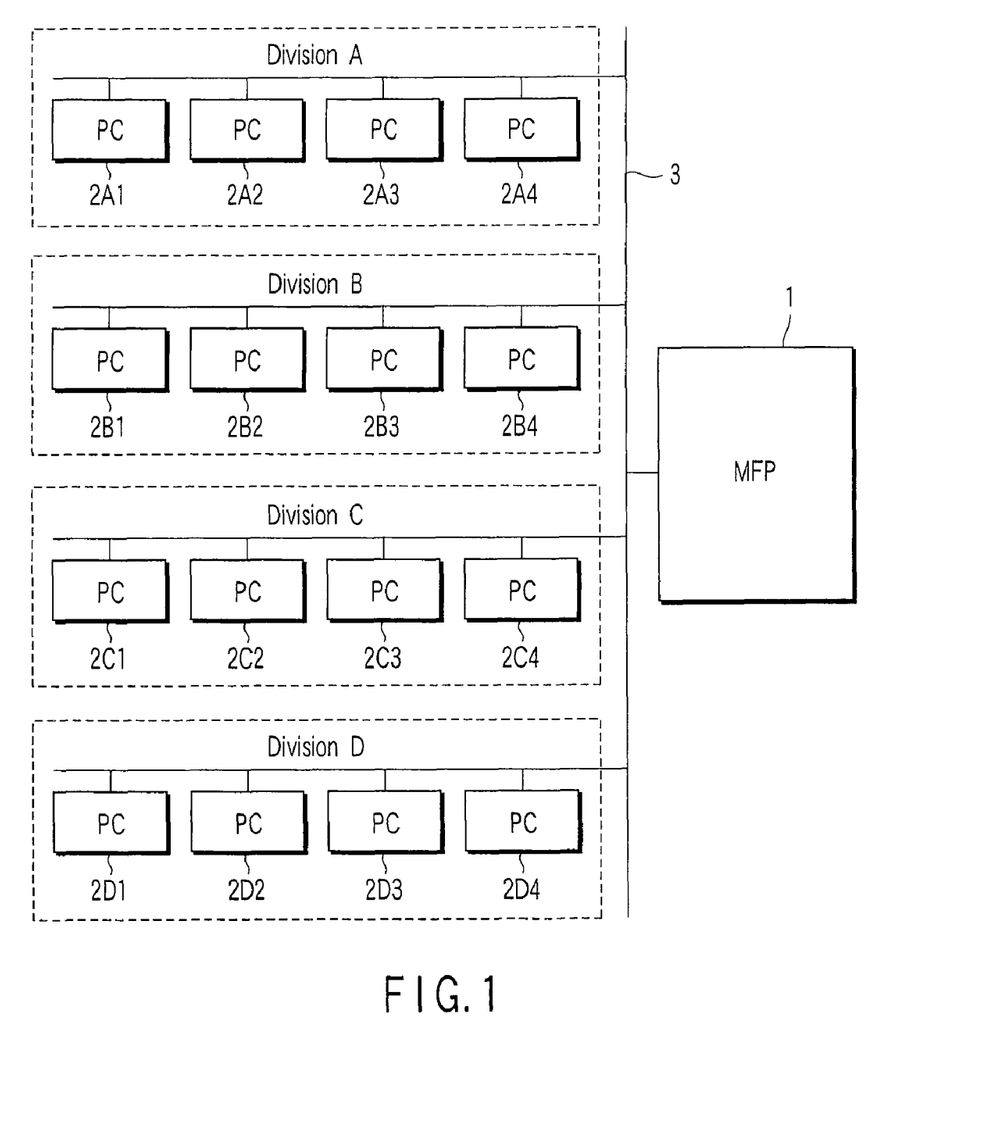
FIG. 1 is a diagram schematically showing a constitution example of an image forming system in an embodiment of the present invention.

FIG. 1 is a diagram showing a schematic constitution of an image forming system in the embodiment of this invention.

As shown in FIG. 1, in this image forming system, a digital multifunction machine (multifunction peripheral [MFP]) 1 as an image forming device is connected to a plurality of personal computers (PCs) 2 (2A1 to 2A4, 2B1 to 2B4, 2C1 to 2C4 and 2D1 to 2D4) by a network 3 such as a local area network (LAN).

The MFP 1 mainly has a printer function, a scanner function, a photocopying function, a facsimile transmitting and receiving function and the like. The MFP 1 has a function which processes a color image and a function which processes a monochromatic image.

That is, the MFP 1 has: a color scanning function which chromatically reads an image of a draft; a monochromatic scanning function which monochromatically reads the image of the draft; a color printing function which forms a color image on an image forming medium; and a monochromatic printing function which forms a monochromatic image on the image forming medium.

Accordingly, the MFP 1 realizes color photocopy and monochromatic photocopy as the photocopying function, and realizes color print and monochromatic print as the printer (network printing) function. It is to be noted that as the facsimile receiving function, the monochromatic print is performed.

Each PC 2 is constituted of a main body having a network interface (not shown), a display unit (not shown), an operation unit (not shown) and the like. The PC 2 has a function which requests the MFP 1 to print the image via the network 3. In the function which requests the MFP 1 to print the image, each PC 2 transmits color image data or monochromatic image data as printing image data.

For example, when the MFP 1 is requested to print the color image data, by the PC 2, the peripheral performs the color print based on the color image data received by a network printing function. When the MFP 1 is requested to print the monochromatic image data, by the PC 2, the performs the monochromatic print based on the monochromatic image data received by the network printing function.

Moreover, it is assumed that the PCs 2 (2A1 to 2A4, 2B1 to 2B4, 2C1 to 2C4 and 2D1 to 2D4) are assigned to the users divided into groups referred to as divisions, respectively. Here, the division refers to the group to which each user having each PC 2 assigned thereto belongs. In an organization such as a company, it is assumed that a department, a section or the like as a place to which each of a plurality of users belongs corresponds to the division.

In a constitution example shown in FIG. 1, it is indicated that a plurality of PCs 2A1 to 2A4 are used by the users who belong to a division A. In FIG. 1, it is also indicated that a plurality of PCs 2B1 to 2B4 are used by the users who belong to a division B. It is further indicated in FIG. 1 that a plurality of PCs 2C1 to 2C4 are used by the users who belong to a division C. It is further indicated in FIG. 1 that a plurality of PCs 2D1 to 2D4 are used by the users who belong to a division D.

Next, there will be described a constitution of a control system of the MFP 1.

Figure 2:
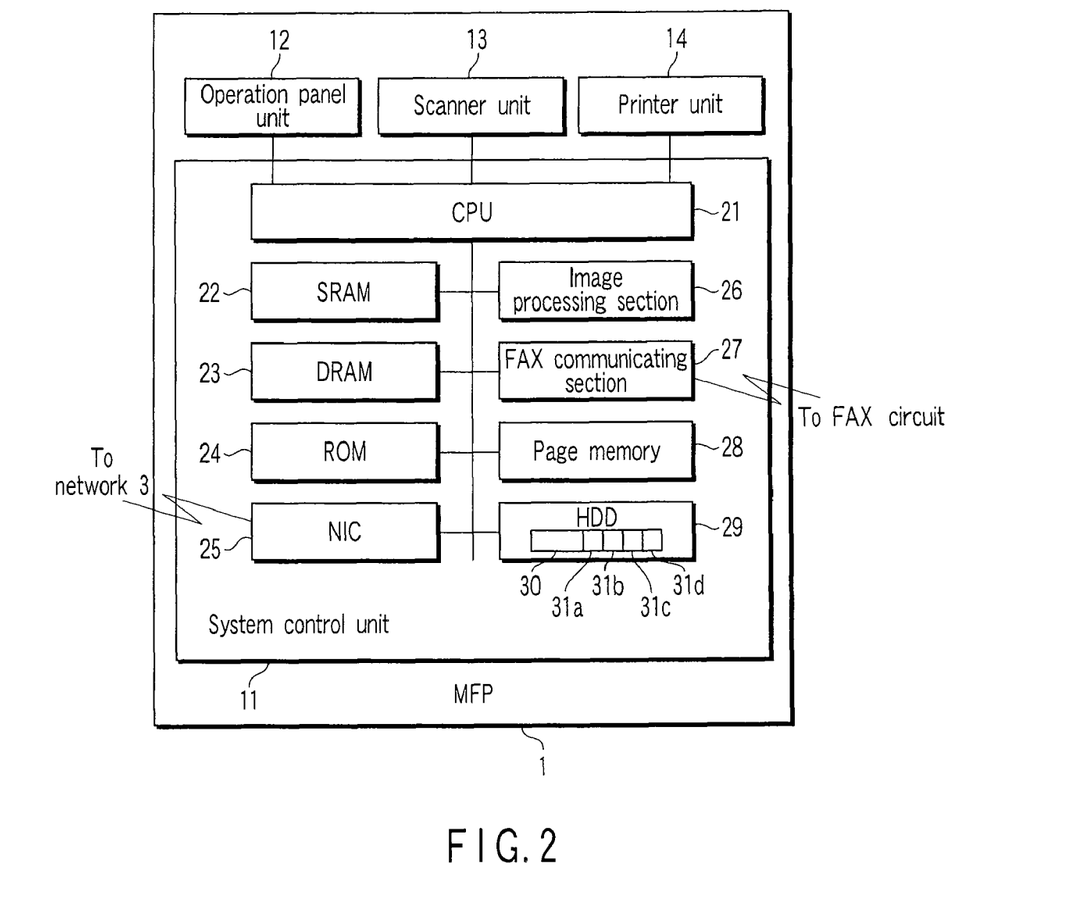
FIG. 2 is a block diagram schematically showing a constitution example of a digital multifunction machine.

FIG. 2 is a block diagram showing a constitution example of the control system of the MFP 1.

As shown in FIG. 2, this MFP 1 is constituted of a system control unit 11, an operation panel 12, a scanner unit 13, a printer unit 14 and the like.

The system control unit 11 controls the whole MFP 1. The system control unit 11 is connected to the operation panel 12, the scanner unit 13, the printer unit 14 and the like. Accordingly, the system control unit 11 accepts an operation instruction input into the operation panel 12, controls the scanner unit 13, or controls the printer unit 14.

Moreover, in addition to the function which controls the scanner unit 13 and the printer unit 14, the system control unit 11 also has functions which perform various types of processing such as network communication control, facsimile transmission and reception, division (or user) authentication, data management, image judgment and image correction.

The operation panel 12 is a user interface. The operation panel 12 is constituted of hardware keys (not shown), a display device (not shown) containing a touch panel and the like. The operation panel 12 displays an operation guidance and the like, and an operation instruction is input. Settings of various types of functions, setting information and the like are input by mean of the operation panel 12.

The scanner unit 13 converts the draft image into image data. The scanner unit 13 converts the draft image into chromatic or monochromatic digital image data. The scanner unit 13 is constituted of: a scanning unit (not shown) which optically scans a draft face; a photoelectric converting section (not shown) such as a CCD line sensor which converts, into an electric signal, reflected light from the draft face optically scanned by the scanning section and the like. The scanner unit 13 supplies the digital image data as the read draft image to the system control unit 11.

The printer unit 14 forms the image on the image forming medium. The printer unit 14 has a color printing function which forms a color image on the image forming medium based on the color image data, and a monochromatic printing function which forms a monochromatic image on the image forming medium based on the monochromatic image data.

The printer unit 14 is constituted of: a conveying section (not shown) which conveys the image forming medium, an image forming section (not shown) which forms a color image or a monochromatic image on the image forming medium conveyed by the conveying section and the like. The printer unit 14 prints the image data of each page on the image forming medium based on the control performed by the system control unit 11.

Moreover, as shown in FIG. 1, the system control unit 11 is constituted of: a central processing unit (CPU) 21; a static random access memory (SRAM) 22; a dynamic random access memory (DRAM) 23; a read only memory (ROM) 24; a network communication section 25; an image processing section 26; a facsimile (fax) communicating section 27; a page memory 28; a hard disk drive (HDD) 29 and the like.

The CPU 21 controls the whole system control unit 11. The CPU 21 operates based on a control program to perform various types of processing. The CPU 21 is connected to the operation panel 12, the scanner unit 13, the printer unit 14 and the like.

The SRAM 22 is backed up by a battery (not shown), and used as a memory which stores system setting information and the like. Data for changing and the like are stored in the SRAM 22. For example, a count value of the number of the pages printed by a division management function described later is counted up by a counter set in the SRAM 22.

The DRAM 23 is a memory which temporarily stores data for operation or stores data to be referred to. The DRAM 23 is used as a main memory. In a case where, for example, the system setting information and the like are referred to from the outside, the information stored in the DRAM 23 is referred to.

The ROM 24 is a nonvolatile memory. In the ROM 24, there are stored, for example, the control program, control data and the like for controlling the MFP 1. The network communication section 25 controls data communication via the network 3. The network communication section 25 is constituted of a network interface card (NIC) to be connected to the network 3 and the like. In the network communication section 25, a network printer function receives a request for printing the printing image data and the like from each PC 2 via the network 3.

The image processing section 26 subjects the image data to various types of image processing. The image processing section 26 is constituted of an image processing circuit and the like. The image processing section 26 performs image processing such as correction, compression or expansion of the image data. The facsimile communicating section 27 is an interface which transmits and receives facsimile data. For example, facsimile reception processing is realized by monochromatically printing, by the printer unit 14, facsimile data received by the facsimile communicating section 27, and facsimile transmission processing is realized by converting the draft image data read by the scanner unit 13 into facsimile data, and transferring the data to a destination by the facsimile communicating section 27.

The page memory 28 is a memory having at least a storage region to develop the image data for one page to be printed by the printer unit 14. The page memory 28 is controlled by a page memory controller (not shown). For example, in a case where the printer unit 14 performs the print processing, in the page memory 28, there is developed (stored) the color image data or the monochromatic image data of each page to be printed by the printer unit 14.

The HDD 29 is a large-capacity storage device. The HDD 29 is also used as a memory for backup of various types of data, and various types of setting data or management data are stored. In the HDD 29, there is stored data received via the network 3, the image data read by the scanner unit 13 or the like, if necessary. In the present embodiment, in the HDD 29, there is stored division management information such as a division code corresponding to a division constituting a management object of the division management function described later.

Moreover, the HDD 29 is provided with: a division undefined counter 30 in which the corresponding division is not defined; a division counter 31 (31a, 31b, 31c and 31d) for each division constituting the management object of the division management function as the division management means and the like. The division undefined counter 30 is a counter which is not associated with a specific division (a counter in which the division is not defined). The division counters 31a, 31b, 31c and 31d are counters associated with the divisions as the management objects, respectively, by the division management function.

It is to be noted that in the constitution example shown in FIG. 2, there is assumed a case where, as shown in FIG. 1, the divisions A, B, C and D are set as the divisions constituting the management objects of the MFP 1. Therefore, in the HDD 29, there are stored division management information such as the division codes corresponding to the divisions A, B, C and D, and there are arranged the division counters 31a, 31b, 31c and 31d associated with the divisions A, B, C and D as the divisions constituting the management objects. That is, the division counter 31 is set for each division constituting the management object of the division management function of the MFP 1.

Next, there will be described the color print and the monochromatic print in the MFP 1 constituted as described above.

Here, it is assumed that the MFP 1 manages various types of processing such as a series of photocopy processing, scanner processing and print processing every unit referred to as a job. For example, the photocopy processing executed in accordance with one instruction is managed as a photocopying job. The photocopy processing includes: scan processing to read a draft image; and print processing to print the image read by the scan processing. Therefore, the photocopying job may be managed by a scanning job and a printing job.

Furthermore, the MFP 1 has a monochromatic photocopy mode, a color (full color) photocopy mode, and an auto color mode as the above photocopying function. The monochromatic photocopy mode is a mode is to read the draft image as the monochromatic image, and monochromatically print the read monochromatic image on the image forming medium. The color photocopy mode is a mode to read the draft image as the color image, and chromatically print the read color image on the image forming medium. In the auto color mode, it is judged whether or not the draft image is chromatic or monochromatic, and color photocopy (color scan and color print) or monochromatic photocopy (color scan and monochromatic print) is executed in accordance with the judgment result.

Moreover, the MFP 1 selectively executes, as the network printing function, the color print or the monochromatic print in accordance with the printing image data received together with the printing request from each PC 2. The MFP 1 manages, as the printing job, the print processing in response to one printing request received as the network printing function.

It is to be noted that as described above, in one printing job, a series of print processing is managed. Therefore, one printing job is a printing job for one page in some case, and a printing job for a plurality of pages in the other case.

Next, there will be described the division management function of the MFP 1.

The division management function of the MFP 1 is a function of division management means for managing use results (the number of printed pages, etc.) of the MFP 1 for each division. For example, in the image forming system shown in FIG. 1, the division management function of the MFP 1 manages the number of the pages printed for each division or limits the number of printable pages for each division. It is to be noted that the division management function is set to be valid or invalid by an operation of the operation panel 12.

Moreover, division management information (information on the division code, the division counter or the like) on the division as the management object of the division management function is set beforehand by the operation panel 12 or the like, and stored in the HDD 29 or the like. That is, the division managed by the division management function is set beforehand as the division management information associated with the division code for identifying the division. As the division management information, the division counter 31 associated with the division code is also defined (set). The division counter 31 is a counter which counts the number of the pages printed for each division. In a case where an upper limit of the number of the pages printed for each division is set, the upper limit of the number of the printed pages is also stored as a part of the division management information in the HDD 29. It is to be noted that in a case where the color management function described later is valid, in the HDD 29, the upper limit of the number of only the chromatically printed pages may be set as a part of the division management information.

For example, in the image forming system shown in FIG. 1, the divisions constituting the management objects are the divisions A, B, C and D. In this case, unique division codes are set to the divisions (divisions A, B, C and D), respectively. In a case where the thus set division management function is valid, the MFP 1 identifies the division to which the user belongs based on the division code designated by the user.

For example, in a case where the photocopying function is utilized in a state in which the division management function is valid, the user inputs the division code by the operation panel 12 of the MFP 1. When the user inputs the division code by the operation panel 12, the MFP 1 authenticates the user's division based on the division code input by the user and the division code as the division management information set beforehand. Accordingly, when the user's division is identified, the MFP 1 is brought into a state in which the photocopying is possible in response to the user's operation. When the user operates the operation panel 12 to request desired photocopy in this state, the MFP 1 executes the requested photocopy processing, and manages the number of the printed photocopy pages as the use result of the identified division.

Moreover, in a case where the network printing function is utilized in a state in which the division management function is valid, the user designates, by each PC 2, the printing image data and the division code of the division to which the user belongs. In this case, the PC 2 transmits a printing request including the printing image data and the division code to the MFP 1 via the network 3. On receiving the printing request from the PC 2 via the network 3, the MFP 1 authenticates the user's division based on the division code included in the received printing request and the division code as the division management information set beforehand. Accordingly, when the user's division is identified, the MFP 1 executes the print processing based on the received printing image data, and manages the number of the pages printed in the print processing as the use results of the identified division.

Next, there will be described a color managing (management for color only) function to be performed in a case where the division management function is valid.

The MFP 1 has the color management (management for color only) function which manages only the number of the chromatically printed pages for each division, when the division management function is valid. This color management function is a function of limiting management means for counting only the number of the chromatically printed pages, for each division in the division management function. In other words, the color management function is a function (a function which does not manage the monochromatic print for each division) which does not count the number of monochromatically printed pages, by the division counter.

In the MFP 1 having a state in which the above color management function is valid, the number of the monochromatically printed pages is not a management object, and only the number of the chromatically printed pages is managed. That is, in a state in which the color management function is valid, the number of the chromatically printed pages is counted in the division counter 31 disposed in each division, and the number of the monochromatically printed pages is counted in the division undefined counter 30. As a result, when the color management function is valid, the monochromatic print is limitlessly performed even in a state in which the division is not identified.

In general, in the monochromatic print, consumption of a developer such as toner, a photosensitive member or the like is small, and cost is small as compared with the color print. The monochromatic print is utilized in performing miscellaneous daily printings in many cases. In such a situation, there is a case where any restriction is not imposed on the monochromatic print, and the color print only is managed. In such a case, the above color management function is required. According to the color management function, the monochromatic print can limitlessly be performed, and it is possible to manage the only use result of the color print.

Next, there will be described a printing control in a case where the printing job is generated in the MFP 1 constituted as described above.

Figure 3:
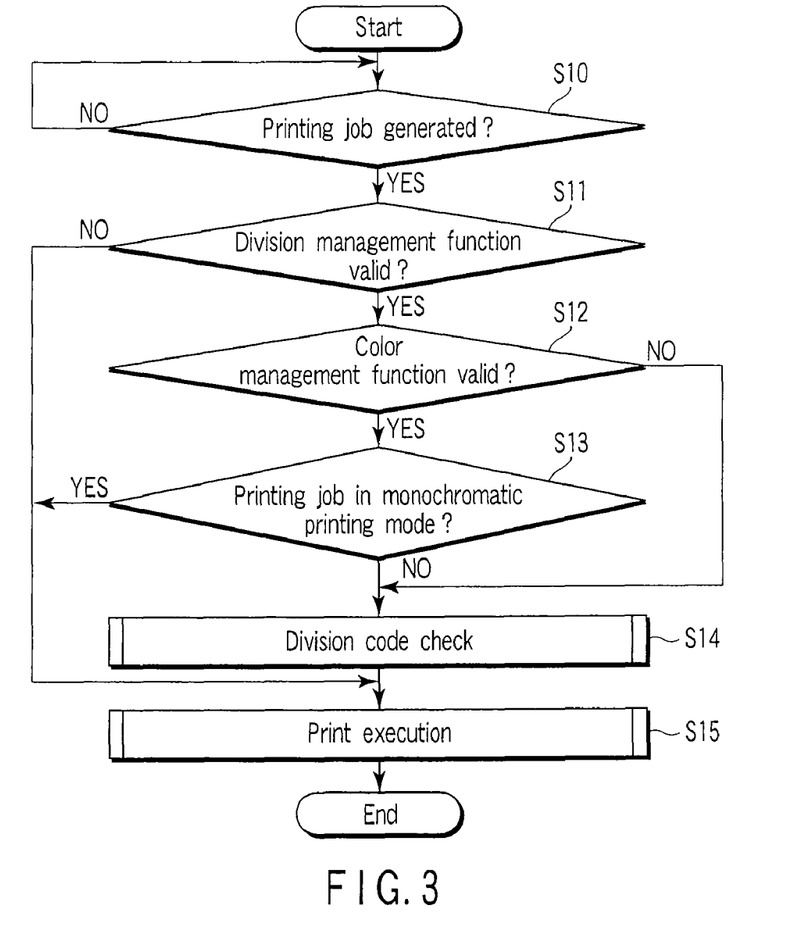
FIG. 3 is a flowchart schematically showing a printing control with respect to a printing job in the digital multifunction machine.

FIG. 3 is a flowchart schematically showing the printing control in a case where the printing job is generated.

In the MFP 1, in a usual operation state, there is accepted a printing job generated by the photocopying function, the network printing function, the facsimile function or the like (step S10). In this state, for example, in a case where the printing request is received from the PC 2 as the network printing function, facsimile data is received as the facsimile function, or a request for list output is received, one printing job is generated in the MFP 1.

When such printing job is generated (step S10, YES), the CPU 21 of the system control unit 11 judges whether or not the division management function is valid (step S11). In a case where this judgment is that the division management function is invalid (step S11, NO), the CPU 21 executes the print processing with respect to the printing job by the printer unit 14 (step S15). That is, in a case where the division management function is invalid, the printing job is other than the management object of the division management function. Therefore, the system control unit 11 does not count the number of the printed pages as the printing job.

Moreover, in a case where the above judgment is that the division management function is valid (step S11, YES), the CPU 21 judges whether or not the color management function is valid (step S12). In a case where this judgment is that the color management function is valid, the CPU 21 judges whether or not the printing job has a monochromatic printing mode (step S13).

In a case where this judgment is that the printing job has the monochromatic printing mode (step S13, YES), the CPU 21 executes the print processing in the monochromatic printing mode with respect to the printing job (step S15). That is, in a state in which both of the division management function and the color management function are valid, the CPU 21 executes the print as the printing job without checking any division code. This indicates that the input of the division code by the user is not required in a case where both of the division management function and the color management function are valid. In this case, the printer unit 14 performs the monochromatic print in a state in which both of the division management function and the color management function are valid. Therefore, in the system control unit 11, the number of the printed pages (the number of the monochromatically printed pages) during the printing operation in the printer unit 14 is counted up in the division undefined counter 30.

Moreover, in a case where that the judgment is that the color management function is invalid, that is, even in a case where it is judged that the division management function is valid and the color management function is invalid (step S12, NO), the CPU 21 checks the division code (step S14). The above division code check is division code identification processing to determine the division of the user who has requested the printing job. When the division is determined by the above division code check, the printer unit 14 executes the print processing with respect to the printing job (step S15). In this case, the division management function is valid, and the color management function is invalid. Therefore, in the system control unit 11, the division counter 31 is counted up in accordance with the number (the number of the chromatically and monochromatically printed pages) of the printed pages to be counted during the printing operation of the printer unit 14.

Furthermore, in a case where the above judgment is that the mode is not the monochromatic printing mode (i.e., the mode is the full color mode or the auto color mode) (step S13, NO), the CPU 21 checks the division code for identifying the division of the user who has requested the printing job (step S14). When the division is determined by this division code check, the CPU 21 executes the print processing by the printer unit 14 with respect to the printing job (step S15). In this case, both of the division management function and the color management function are valid. Therefore, as to the number of the printed pages to be counted during the printing operation, the printer unit 14 of the system control unit 11 counts up the number of the chromatically printed pages by the division counter 31, and counts up the number of the monochromatically printed pages by the division undefined counter 30.

Figure 4:
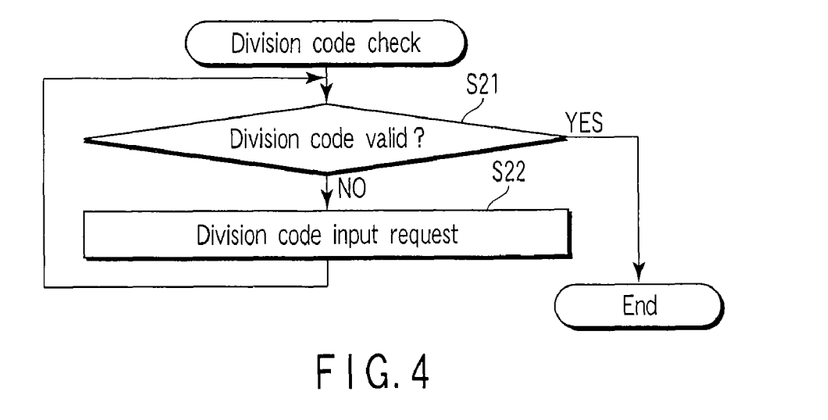
FIG. 4 is a flowchart showing an example of division code check.

FIG. 4 is a flowchart showing a processing example of the division code check. As shown in FIG. 4, in this division code check, the system control unit 11 judges whether or not the division code designated by the user is valid (step S21). In a case where this judgment is that the division code designated by the user is not valid, or the user judges that the division code is not designated (step S21, NO), the CPU 21 requests the user who has requested the printing job to input the division code (step S22).

As this request to the user for the input of the division code, the CPU 21 displays in, for example, the operation panel 12 that the division code be input. In a case where the above judgment is that the division code designated by the user is valid (step S21, YES), the CPU 21 determines the division code as the division of the printing job, and ends the division code check.

Next, there will be described processing to count the number of the pages printed in the printing job executed as described above.

Figure 5:
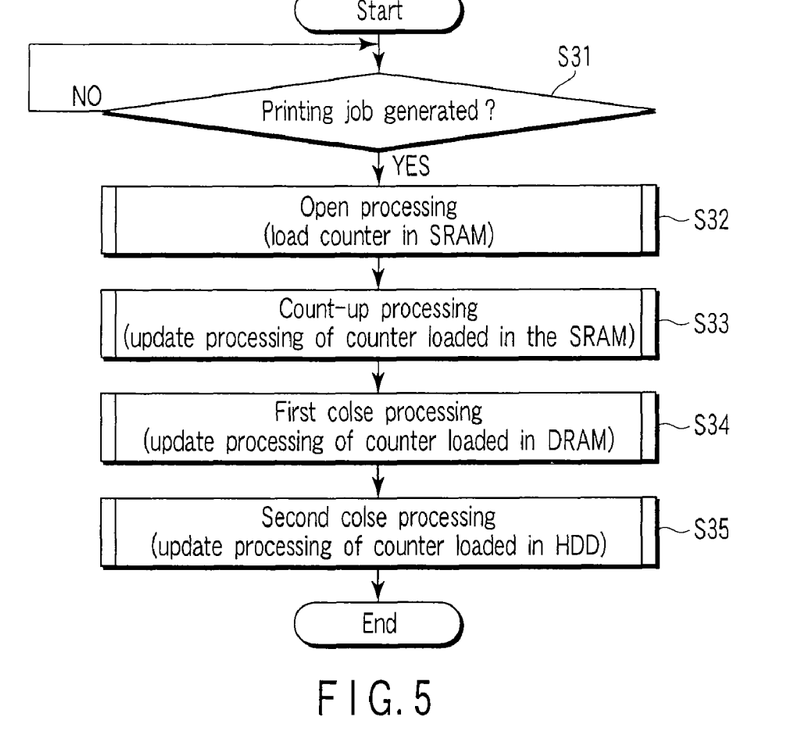
FIG. 5 is a flowchart schematically showing count processing in the printing job.
Figure 6:
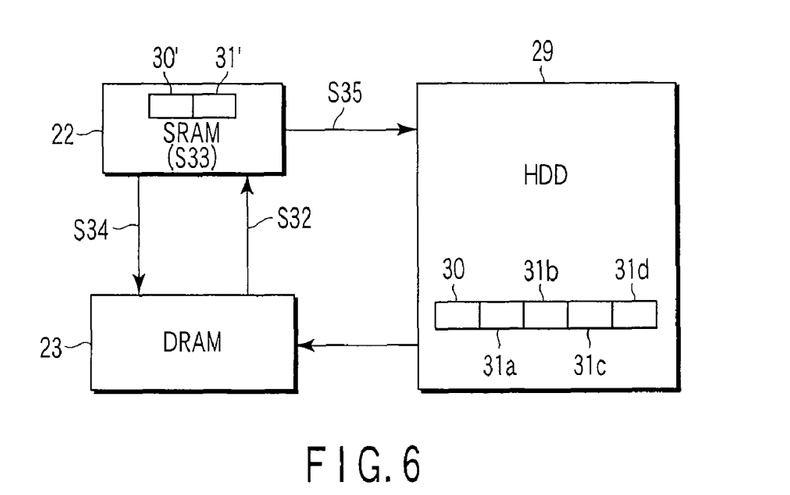
FIG. 6 is a diagram showing processing of division management information among an SRAM, a DRAM and an HDD.

FIG. 5 is a flowchart schematically showing the count processing in a case where the printing job is generated. FIG. 6 is a diagram schematically showing processing of data of the counter value indicating the number of the printed pages with respect to the HDD 29, the DRAM 23 and the SRAM 22.

When a main power supply of the MFP 1 is turned on, the system control unit 11 starts the MFP 1. In this start processing, various functions of the MFP 1 are brought into usable states. In a case where the division management function is valid, in the above start processing, as shown in FIG. 6, the system control unit 11 loads the division management information stored in the HDD 29 in the DRAM 23 as the main memory. The HDD 29 is provided with the division undefined counter 30 which is not associated with the division and the division counter 31 for each division. In the above start processing, the counter value of the division undefined counter 30 of the HDD 29 and the counter values of the respective division counters 31a, 31b, 31c and 31d associated with the division codes of the divisions are loaded as the division management information in the DRAM 23.

In a case where the printing job is generated in the MFP 1 in a state in which the start processing is completed (step S31, YES), the system control unit 11 performs open processing (step S32). As shown in FIG. 6, this open processing loads the division management information from the DRAM 23 as the main memory into the SRAM 22. It is assumed in the present embodiment that in the above open processing, a counting-up counter is set in the SRAM 22. That is, during the open processing, in the SRAM 22, a division undefined counter 30' is set in which the counter value of the division undefined counter 30 loaded in the DRAM 23 is an initial value. Furthermore, in a case where the division of the printing job is determined, in the SRAM 22, there is also set a division counter 31' in which the counter value of the division counter 31 corresponding to the division, loaded in the DRAM 23, is an initial value. It is to be noted that an example of the open processing will be described later in detail.

When the open processing is completed, the system control unit 11 of the MFP 1 performs count-up processing (step S33). This count-up processing is processing to count up the number of the pages printed in the printing job. As shown in FIG. 6, the count-up processing counts up the division undefined counter 30' or the division counter 31' set in the SRAM 22. That is, in a case where the monochromatic print is performed as the printing job in the count-up processing, the division undefined counter 30' in the SRAM 22 is updated in accordance with the number of the monochromatically printed pages. In a case where the color print is performed as the printing job, the division counter 31' in the SRAM 22 is updated in accordance with the number of the chromatically printed pages. It is to be noted that an example of the count-up processing will be described later in detail.

When the count-up processing is completed, the system control unit 11 of the MFP 1 performs first close processing (step S34). This first close processing updates the counter value loaded in the DRAM 23. As shown in FIG. 6, the first close processing updates the counter value in the DRAM 23 based on the counter value counted up in the SRAM 22. That is, the counter value loaded in the DRAM 23 is updated by the counter values of the division undefined counter 30' and the division counter 31' set in the SRAM 22. It is to be noted that the first close processing will be described later in detail.

Together with the first close processing, the system control unit 11 of the MFP 1 performs second close processing (step S35). This second close processing updates the counter values the respective counters 30 and 31 of the HDD 29. As shown in FIG. 6, the above second close processing updates the counter values of the respective counters 30 and 31 of the HDD 29 based on the counter value counted up in the SRAM 22. That is, the counter values of the respective counters in the HDD 29 are updated by the counter values of the division undefined counter 30' and the division counter 31' set in the SRAM 22. It is to be noted that the second close processing will be described later in detail.

In the above-described processing, the counter values of the division undefined counter 30 and the division counter 31 set in the HDD 29 are updated in accordance with the number of the pages printed in the printing job.

Next, the open processing will be described.

Figure 7:
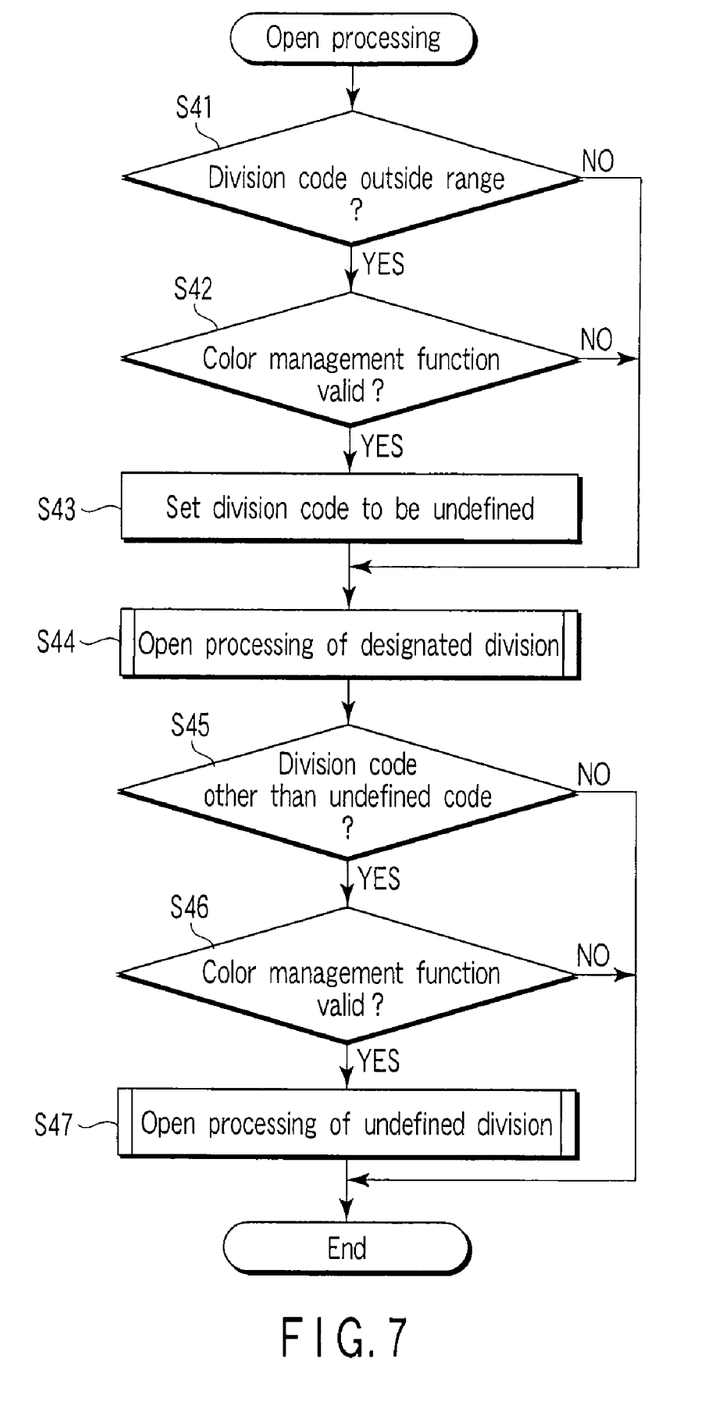
FIG. 7 is a flowchart showing open processing.

FIG. 7 is a flowchart showing an example of the open processing. As shown in FIG. 5, this open processing is executed subsequent to the start processing executed in a case where the printing job is generated. It is to be noted that the example will be described assuming that the division management function is valid.

In the open processing, the CPU 21 of the system control unit 11 first judges whether or not the division code is outside a range (step S41). It is judged whether or not the division code is outside the range by judging whether or not the valid division code is input by the user. That is, the CPU 21 judges whether or not the user has designated the valid division code, when or before the printing job is generated.

In a case where this judgment is that the division code is outside the range (step S41, YES), the CPU 21 judges whether or not the color management function is valid (step S42). In a case where this judgment is that the color management function is valid (step S42, YES), the CPU 21 judges that the division is undefined (step S43). That is, in a case where the user does not designate any division code, and the color management function is valid, the CPU 21 judges that the division is undefined (the division constituting the management object is not designated).

Moreover, in a case where the judgment is that the division code is not outside the range, that is, it is judged that the valid division code is designated by the user (step S41, NO), the CPU 21 performs the open processing of the division corresponding to the division code designated by the user (step S44). In a case where the judgment is that the color management function is not valid (step S42, NO), the CPU 21 accepts the user's designated division code by the above division code check, and performs the open processing of the division (designated division) corresponding to the division code designated by the user (step S44).

In the division open processing, in the SRAM 22, there is set the division counter 31' for counting up the number of the chromatically printed pages for the division designated by the user. That is, in the division open processing, the CPU 21 reads, from the DRAM 23, the counter value of the division counter 31 of the division corresponding to the division code designated by the user. Here, in the DRAM 23, each counter value in the HDD 29 is loaded during the start processing. On reading, from the DRAM 23, the counter value of the division counter 31, the CPU 21 sets the division counter 31' which functions as the division counter in the SRAM 22. In the division counter 31' of the SRAM 22, there is set the counter value of the division counter 31 in the HDD 29, the value being loaded as the initial value in the DRAM 23.

Next, the CPU 21 judges whether or not the division has been defined in the SRAM 22 (step S45). That is, the CPU 21 judges that the division counter 31' has been set in the SRAM 22. In a case where this judgment is that the division is defined (step S45, YES), the CPU 21 judges whether or not the color management function is valid (step S46).

In a case where this judgment is that the color management function is valid (step S46, YES), the CPU 21 performs the open processing of the undefined division (step S47). That is, in a case where the division is defined, and it is judged that the color management function is valid, the CPU 21 performs the open processing of the undefined division.

The above open processing of the undefined division sets, in the SRAM 22, the division undefined counter 30' for counting up the number of the monochromatically printed pages regardless of the division designated by the user. That is, in the open processing of the undefined division, the CPU 21 reads, from the DRAM 23, the counter value of the division undefined counter 30. Here, as described above, the counter value of each counter in the HDD 29 is loaded in the DRAM 23 in the start processing. When the counter value of the division undefined counter 30 is read out from the DRAM 23, the CPU 21 sets, in the SRAM 22, the division undefined counter 30' which functions as the division undefined counter. In this division undefined counter 30' of the SRAM 22, there is set the counter value of the division undefined counter 30 of the HDD 29, the value being loaded as the initial value in the DRAM 23.

Moreover, in a case where the judgment is that the division is not defined (step S45, NO), or the above judgment is that the color management function is not valid (step S46, NO), the CPU 21 ends the open processing accompanying the printing job.

In the above open processing, in a case where the division code is designated, when the color management function is valid, there is set, in the SRAM 22, the division counter 31' for counting up the division counter 31 and the division undefined counter 30' for counting up the division undefined counter 30. Even in a case where any division code is not designated, when the color management function is valid, in the SRAM 22, there is set the division undefined counter 30' for counting up the division undefined counter 30, thereby ending the open processing.

Next, the count-up processing will be described.

Figure 8:
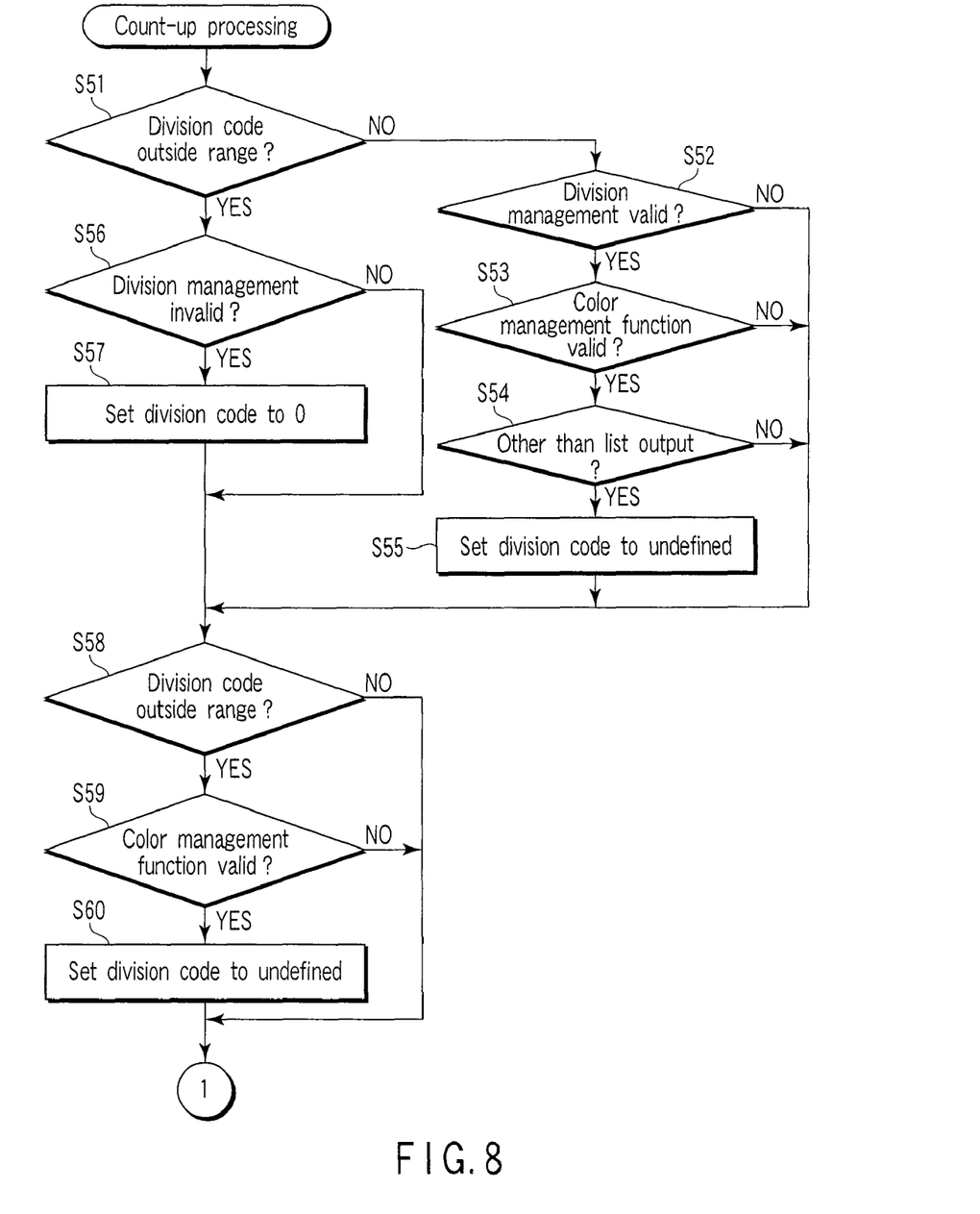
FIG. 8 is a flowchart showing count-up processing.
Figure 9:
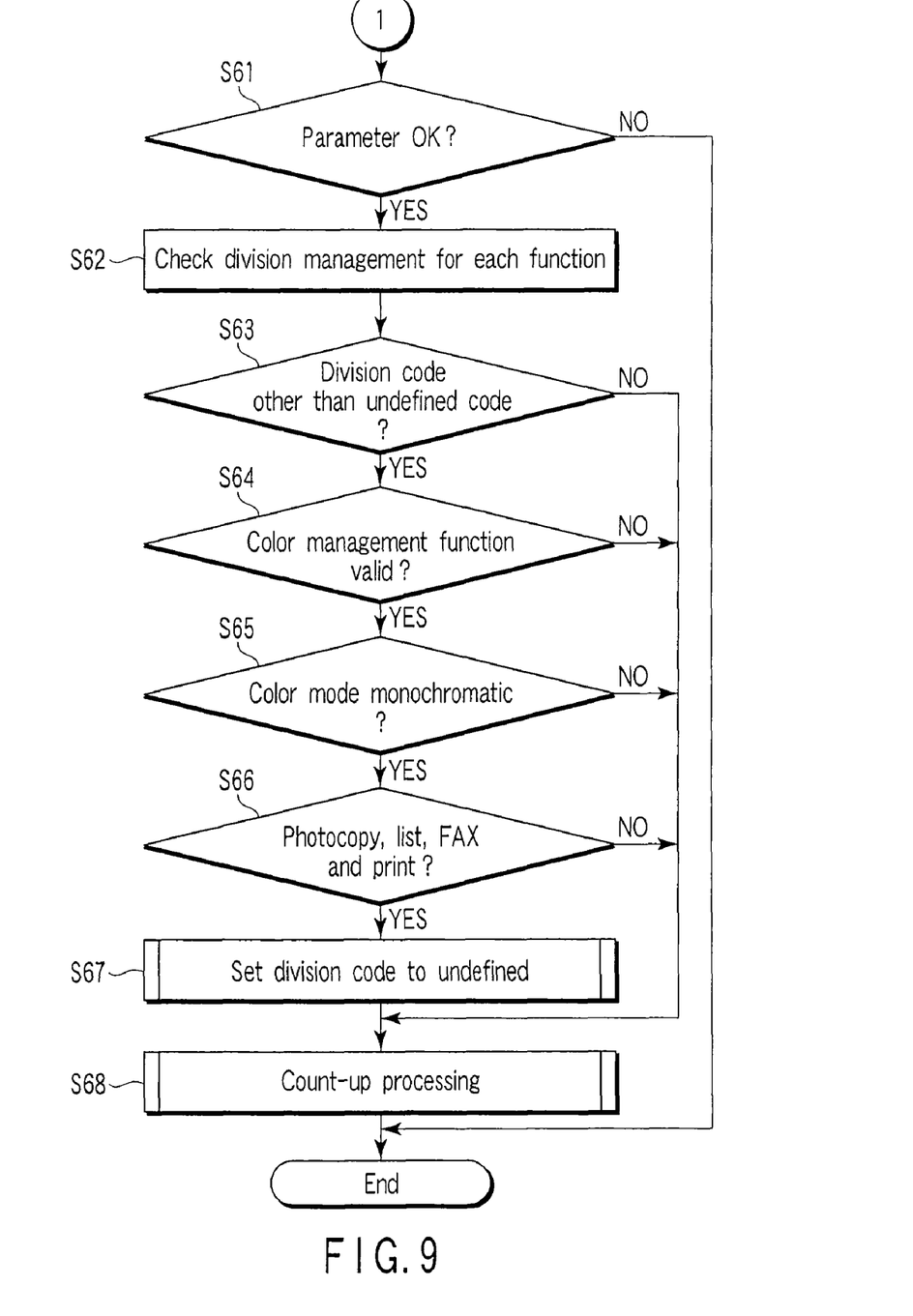
FIG. 9 is a flowchart showing the count-up processing.

FIGS. 8 and 9 are flowcharts showing an example of the count-up processing. This count-up processing is executed subsequently to the open processing as shown in FIG. 5.

In the count-up processing, the CPU 21 of the system control unit 11 first judges whether or not the division code is outside the range (step S51). It is judged whether or not the division code is outside the range by judging whether or not the user has input the valid division code. That is, when the open processing ends, the CPU 21 judges whether or not the user has designated the valid division code.

In a case where this judgment is that the division code is outside the range (step S51, NO), the CPU 21 judges whether or not the division management function is valid (step S52). In a case where this judgment is that the division management function is valid (step S52, YES), the CPU 21 judges whether or not the color management function is valid (step S53). In a case where this judgment is that the color management function is valid (step S53, YES), the CPU 21 further judges whether or not the printing job is print processing other than list output processing (step S54). In a case where this judgment is that the printing job is the print processing other than the list output processing (step S54, YES), the CPU 21 sets the division to remain undefined (step S55).

Moreover, in a case where the above judgment is that the division management function is not valid (step S52, NO), the judgment is that the color management function is not valid (step S53, NO), or the judgment is that the printing job is the list output processing (step S54, NO), the CPU 21 advances to step S58 described later.

Furthermore, in a case where the above judgment is that the division code is outside the range (step S51, YES), the CPU 21 judges whether or not the division management function is invalid (step S56). In a case where this judgment is that the division management function is invalid (step S56, YES), the CPU 21 sets, as the division code, "0" indicating that the division management function is invalid (step S57). In a case where the above judgment is that the division management function is not invalid, that is, it is judged that the division management function is valid (step S56, NO), the CPU 21 advances to the step S58 described later.

Next, the CPU 21 judges whether or not the division code is outside the range (step S58). In a case where this judgment is that the division code is outside the range (step S58, YES), the CPU 21 judges whether or not the color management function is valid (step S59). In a case where this judgment is that the color management function is valid (step S59, YES), the CPU 21 judges that the division of the printing job is undefined (step S60). In a case where the judgment is that the division code is not outside the range (step S58, NO), or the above judgment is that the color management function is not valid (step S59, NO), the CPU 21 advances to step S61 described later.

Next, the CPU 21 judges whether or not various parameters are valid with respect to the printing job (step S61). In a case where this judgment is that various parameters are not valid (step S61, NO), the CPU 21 ends the count-up processing with respect to the printing job. In a case where the judgment is that various parameters are valid (step S61, YES), the CPU 21 checks a set state of division management in accordance with the function which executes the printing job (step S62).

When the set state of the division management is checked for each function, the CPU 21 judges whether or not the division of the printing job is other than an undefined division (step S63). This judgment is whether or not the division has been defined in the processing up to this step. In a case where this judgment is that the division is other than the undefined division, that is, it is judged that the division is defined (step S63, YES), the CPU 21 judges whether or not the color management function has a valid state (step S64).

In a case where this judgment is that the color management function is valid (step S64, YES), the CPU 21 judges whether or not the printing mode (color mode) of the printing job is a monochromatic printing mode (step S65). In a case where this judgment is that the color mode is the monochromatic printing mode (step S65, YES), the CPU 21 judges whether or not the printing job is any of predetermined functions such as a photocopying function, a network printing function, a list printing function and a fax receiving (printing) function (step S66).

In a case where this judgment is that the printing job is any of the predetermined functions such as the photocopying function, the network printing function, the list printing function and the fax printing function (step S66,YES), the CPU 21 decides that the counter to be counted up is the division undefined counter. That is, it is assumed in the CPU 21 that the number of printed pages is counted up by the division undefined counter 30' defined in the SRAM 22 (step S67). In this case, the CPU 21 counts up the number of printed pages counted in the printer unit 14 by the division undefined counter 30' of the SRAM 22 in the count-up processing (step S68).

Therefore, in a state in which both of the division management function and the color management function are valid, the number of printed pages (monochromatically printed pages) counted in the printer unit 14 is counted up by the division undefined counter 30' regardless of whether or not the division code is designated by the user, that is, the division of the printing job is determined. In other words, in a state in which both the division management function and the color management function are valid, the number of monochromatically printed pages is counted up by the division undefined counter 30' without designating any division code by the user.

Moreover, in a case where the above judgment is that the color management function is not valid (step S64, NO), the CPU 21 counts up all of the pages (in this case, monochromatically and chromatically printed) printed in the printer unit 14, by the division counter 31' defined in the SRAM 22 (step S68). Therefore, in a case where the division management function is valid and the color management function is invalid, the CPU 21 counts, by the division counter 31', all of the pages printed by the printer unit 14.

Furthermore, in a case where the judgment is that the mode of the printing job is not the monochromatic printing mode, that is, it is judged that the printing job mode is a color printing mode (step S65, NO), the CPU 21 counts up all of the pages printed (in this case, chromatically printed) by the printer unit 14, by the division counter 31' defined in the SRAM 22 (step S68). Therefore, in a state in which both the division management function and the color management function are valid, the CPU 21 defines the division counter of the printing job in the SRAM 22, and counts, by the defined division counter, the number of pages chromatically printed by the printer unit 14.

It is to be noted that in a case where it is judged in step S63 that the division of the printing job is not other than the undefined division, that is, the division of the printing job is undefined up to this step (step S63, NO), the CPU 21 counts up the total number of pages printed by the printer unit 14, by the division undefined counter 30' in the SRAM 22 (step S68).

In a case where it is judged in step S66 that the printing job is not any of predetermined functions such as the photocopying function, the network printing function, the list printing function and the fax printing function, the CPU 21 counts, by the division counter 31', all of the pages printed by the printer unit 14.

According to the above count-up processing, in a state in which both the division management function and the color management function are valid, the number of monochromatically printed pages is counted up by the division undefined counter 30' without designating any division code by the user. The number of chromatically printed pages is counted up by the division counter 31', after the division counter 31' is defined based on the division code designated by the user.

Next, there will be described close processing in accordance with the first and second close processing.

Figure 10:
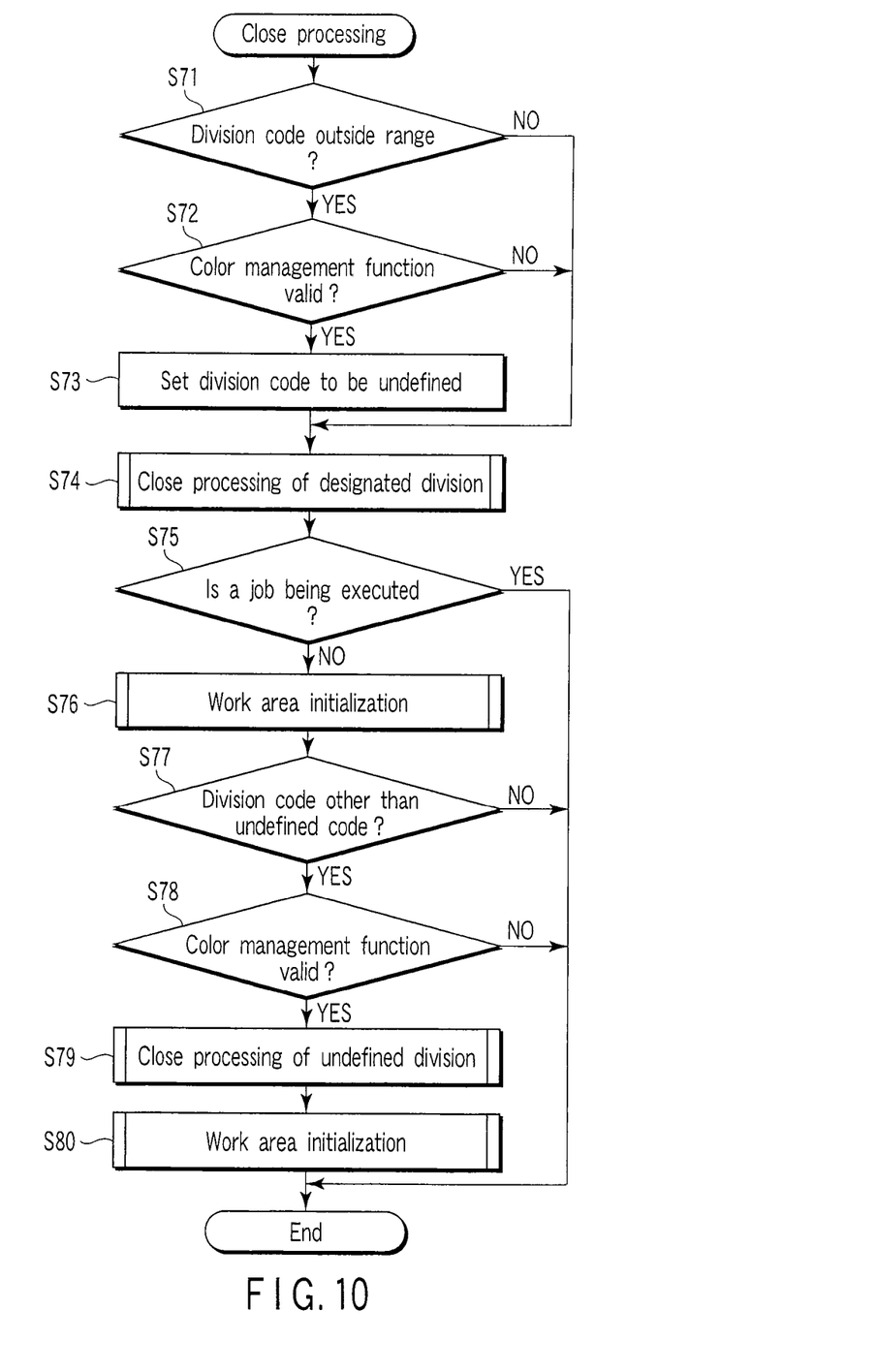
FIG. 10 is a flowchart showing close processing.

FIG. 10 is a flowchart showing an example of the close processing in accordance with the first and second close processing. As shown in FIG. 5, this close processing is executed subsequently to the count processing, after the printing job ends. It is to be noted that here in the description, it is assumed that the division management function is valid.

In the close processing, the CPU 21 of the system control unit 11 first judges whether or not the division code is outside a range (step S71). It is judged whether or not the division code is outside the range by judging whether or not the valid division code has been input by the user. That is, when or before the printing job is generated, the CPU 21 judges whether or not the user has designated the valid division code.

In a case where this judgment is that the division code is outside the range (step S71, YES), the CPU 21 judges whether or not the color management function is valid (step S72). In a case where this judgment is that the color management function is valid (step S72, YES), it is assumed in the CPU 21 that the division is undefined (step S73). That is, in a case where no division code is designated by the user, and the color management function is valid, it is assumed in the CPU 21 that the division is undefined (division as the management object is not designated).

Moreover, in a case where the above judgment is that the division code is outside the range, that is, it is judged that the valid division code is designated by the user (step S71, NO), the CPU 21 performs the close processing of the division corresponding to the division code designated by the user (step S74). In a case where the above judgment is that the color management function is not valid (step S72, NO), the CPU 21 performs the close processing of the designated division corresponding to the division code designated by the user (step S74).

The close processing of the designated division closes the division counter 31' which is set in the SRAM 22 and which counts up the number of pages chromatically printed for the division designated by the user. That is, in the close processing of the designated division, the CPU 21 reads out the counter value of the division counter 31' in the SRAM 22. On reading, from the SRAM 22, the counter value of the division counter 31', the CPU 21 performs the first close processing to update the counter value of the division counter 31 corresponding to the division, loaded in the DRAM 23, into the counter value of the division counter 31'. Similarly, the CPU 21 performs the second close processing to update the counter value of the division counter 31 corresponding to the division in the HDD 29 into the counter value of the division counter 31'.

When the close processing of the designated division corresponding to the printing job is completed, the CPU 21 judges whether or not there is another printing job being executed (step S75). In a case where this judgment is that there is a printing job being executed (step S75, YES), the CPU 21 ends the close processing without performing any close processing of the undefined division.

Moreover, in a case where the above judgment is that there is no printing job being executed (step S75, NO), the CPU 21 initializes a work area used as the division counter 31' of the SRAM 22 (step S76). When the work area is initialized, the CPU 21 judges whether or not the division is other than the undefined division (step S77). That is, the CPU 21 judges whether or not the division of the printing job has been defined. In a case where this judgment is that the division is other than the undefined division (step S77, YES), the CPU 21 judges whether or not the color management function is valid (step S78).

In a case where this judgment is that the color management function is valid (step S78, YES), the CPU 21 performs the close processing of the undefined division (step S79). That is, in a case where the division is defined with respect to the printing job, and the color management function is valid, the CPU 21 performs the close processing of the undefined division (step S79). When the close processing of the undefined division ends, the CPU 21 initializes the work area used as the division undefined counter 30' of the SRAM 22 (step S80).

The close processing of the undefined division closes the division undefined counter 30' which counts up the number of pages monochromatically printed regardless of the division designated by the user and which is set in the SRAM 22. That is, in the close processing of the undefined division, the CPU 21 reads out the counter value of the division undefined counter 30' of the SRAM 22. On reading, from the SRAM 22, the counter value of the division undefined counter 30', the CPU 21 performs the first close processing to update the counter value of the division undefined counter 30, loaded in the DRAM 23, into the counter value of the division undefined counter 30'. Similarly, the CPU 21 performs the second close processing to update the counter value of the division undefined counter 30 of the HDD 29 into the counter value of the division undefined counter 30'.

As described above, in the present embodiment, in a state in which both the division management function and the color management function are valid, the pages are monochromatically printed unless the division is determined. After the division is determined, the pages are chromatically printed.

In consequence, even in a case where the division management function is valid, when the color management function is valid, the monochromatic print can be performed without inputting any division code. As a result, the division management can be realized in response to user's request while the user's convenience is improved.

Furthermore, the division counter for each division and the division undefined counter are set beforehand. The number of chromatically printed pages is counted in the division counter set in accordance with user's designation of the division code, and the number of monochromatically printed pages is counted in the division undefined counter set regardless of user's designation of the division code.

In consequence, only the number of chromatically printed pages can be counted for each division designated by the user, and managed in accordance with user's demand. Moreover, the total number of monochromatically printed pages can be managed regardless of the division, and it is also possible to normally count the total number of the printed pages for use in maintenance of the MFP 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming device comprising:
   an image forming unit to form a color image on an image forming medium if an operation mode is a color mode and to form a monochromatic image on the image forming medium if the operation mode is a monochromatic mode;
   an identification unit to identify a division to which a user belongs who has requested image forming;
   a division management unit to manage the number of pages having the image formed thereon for each division identified by the identification unit;
   a color management unit to manage the number of pages having the image formed thereon in the color mode;
   a control unit to execute the image forming in the monochromatic mode for a job requiring the monochromatic mode in the image forming unit without identifying the division by the identification unit, in a case where the division management unit and the color management unit are valid,
   the control unit executing the image forming in the color mode in the image forming unit, if the division to which the user belongs is identified by the identification unit, in a case where the division management unit and the color management unit are valid, and the control unit executing the image forming in the color mode and monochromatic mode in the image forming unit if the division to which the user belongs is identified by the identification unit, in a case where the division management unit is valid and the color management unit is not valid.

2. The image forming device according to claim 1, further comprising:
   a counting unit to count the number of pages having the image formed thereon in the color mode for each division identified by the identification unit, in a case where the division management unit is valid and the color management unit is valid.

3. The image forming device according to claim 2, further comprising:
   a plurality of division counters to be associated with the divisions to which the users belong, respectively; and
   wherein the counting unit counts the number of pages having the image formed thereon in the color mode by the division counter corresponding to the division identified by the identification unit, in a case where the division management unit is valid and the color management unit is valid.

4. The image forming device according to claim 3 further comprising:
   a division undefined counter not to be associated with any one of the divisions, and
   wherein the counting unit counts the number of pages having the image formed thereon in the monochromatic mode by the division unidentified counter, in a case where the division management unit is valid and the color management unit is valid.

5. A method of managing an image forming device, comprising:
   accepting a request for image forming in a color mode or a request for image forming in monochromatic mode;
   identifying a division to which a user belongs who has requested the accepted image forming;

executing the image forming in the monochromatic mode for a job requiring the monochromatic mode without identifying the division, in a case where a division management function which manages the number of pages having an image formed thereon for each division is valid and a color management function which manages the number of pages having an image formed thereon in the color mode is valid, executing the image forming in the color mode and monochromatic mode in the image forming unit if the division to which the user belongs is identified by the identification unit, in a case where the division management function is valid and the color management function is not valid, and counting the number of pages having the image formed thereon in the color mode for each identified division, in a case where the division management function is valid and the color management function is valid.

6. The method of managing the image forming device according to claim 5, further comprising:

counting the number of pages having the image formed thereon in the color mode for each identified division, in a case where the division management function is valid and the color management function is valid.

7. The method of managing the image forming device according to claim 6, wherein the counting includes:

counting the number of pages having the image formed thereon in the color mode by a division counter associated with the identified division, in a case where the division management function is valid and the color management function is valid.

8. The method of managing the image forming device according to claim 7 further comprising counting the number of pages having the image formed thereon in the monochromatic mode by a division unidentified counter not associated with any one of the divisions, in a case where the division management function is valid and the color management function is valid.

9. An image forming device comprising:

image forming means for forming a color image on an image forming medium if an operation mode is a color mode, and for forming a monochromatic image on the image forming medium if the operation mode is a monochromatic mode;

identification means for identifying a division to which a user belongs who has requested image forming;

division management means for managing the number of pages having the image formed thereon for each division identified by the identification means;

color management means for managing the number of pages having the image formed thereon in the color mode; and control means for executing the image forming in the monochromatic mode for a job requiring the monochromatic mode in the image forming means without identifying the division by the identification means, in a case where the division management means and the color management means are valid, the control means executing the image forming the color mode in the image forming means, if the division to which the user belongs is identified by the identification means, in a case where the division management means and the color management means are valid, and the control means executing the image forming in the color mode and the monochromatic mode in the image forming means if the division to which the user belongs is identified by the identification means, in a case where the division management means is valid and the color management means is not valid.

10. The image forming device according to claim 9, further comprising:

counting means for counting the number of pages having the image formed thereon in the color mode for each division identified by the identification means, in a case where the division management means is valid and the color management means is valid.

11. The image forming device according to claim 10, further comprising:

a plurality of division counters to be associated with the divisions to which the users belong, respectively; and wherein the counting means counts the number of pages having the image formed thereon in the color mode by the division counter corresponding to the division identified by the identification means, in a case where the division management means is valid and the color management means is valid.

12. The image forming device according to claim 11 further comprising:

a division undefined counter not to be associated with any one of the divisions, and wherein the counting means counts the number of pages having the image formed thereon in the monochromatic mode by the division unidentified counter, in a case where the division management means is valid and the color management means is valid.

* * * * *